(12) United States Patent
Dunham et al.

(10) Patent No.: US 10,423,446 B2
(45) Date of Patent: Sep. 24, 2019

(54) DATA PROCESSING

(71) Applicant: ARM Limited, Cambridge (GB)

(72) Inventors: Curtis Glenn Dunham, Austin, TX (US); Jonathan Curtis Beard, Austin, TX (US); Roxana Rusitoru, Cambridge (GB)

(73) Assignee: ARM Limited, Cambridge (GB)

( * ) Notice: Subject to any disclaimer, the term of this patent is extended or adjusted under 35 U.S.C. 154(b) by 184 days.

(21) Appl. No.: 15/361,871

(22) Filed: Nov. 28, 2016

(65) Prior Publication Data

US 2018/0150322 A1 May 31, 2018

(51) Int. Cl.
*G06F 9/48* (2006.01)
*G06F 9/50* (2006.01)
(Continued)

(52) U.S. Cl.
CPC ............ *G06F 9/4881* (2013.01); *G06F 9/461* (2013.01); *G06F 9/4831* (2013.01);
(Continued)

(58) Field of Classification Search
None
See application file for complete search history.

(56) References Cited

U.S. PATENT DOCUMENTS 6,973,650 B1   12/2005  Parkes
7,373,646 B1    5/2008  Smith
(Continued)

FOREIGN PATENT DOCUMENTS

EP        1 570 352       9/2005
WO    WO 2008/061154     5/2008

OTHER PUBLICATIONS

International Search Report and Written Opinion of the International Searching Authority dated Feb. 9, 2018 in PCT/GB2017/053370, 17 pages.

(Continued)

*Primary Examiner* — Dong U Kim
(74) *Attorney, Agent, or Firm* — Nixon & Vanderhye P.C.

(57) ABSTRACT

Data processing apparatus comprises one or more interconnected processing elements each configured to execute processing instructions of a program task; coherent memory circuitry storing one or more copies of data accessible by each of the processing elements, so that data written to a memory address in the coherent memory circuitry by one processing element is consistent with data read from that memory address in the coherent memory circuitry by another of the processing elements; the coherent memory circuitry comprising a memory region to store data, accessible by the processing elements, defining one or more attributes of a program task and context data associated with a most recent instance of execution of that program task; the apparatus comprising scheduling circuitry to schedule execution of a task by a processing element in response to the one or more attributes defined by data stored in the memory region corresponding to that task; and each processing element which executes a program task is configured to modify one or more of the attributes corresponding to that program task in response to execution of that program task.

17 Claims, 6 Drawing Sheets

(51) Int. Cl.
  *G06F 12/0815* (2016.01)
  *G06F 9/46* (2006.01)
  *G06F 9/54* (2006.01)

(52) U.S. Cl.
  CPC .......... *G06F 9/4843* (2013.01); *G06F 9/5005* (2013.01); *G06F 9/544* (2013.01); *G06F 12/0815* (2013.01)

(56) References Cited

U.S. PATENT DOCUMENTS

| | | | |
|---|---|---|---|
| 7,484,208 B1 | 1/2009 | Nelson | |
| 7,493,621 B2 | 2/2009 | Bradford | |
| 2005/0010728 A1* | 1/2005 | Piry | G06F 12/0831 711/147 |
| 2006/0168347 A1 | 7/2006 | Martin | |
| 2006/0259749 A1 | 11/2006 | Veale | |
| 2008/0140971 A1 | 6/2008 | Dankel | |
| 2008/0201561 A1 | 8/2008 | Bates | |
| 2008/0263323 A1 | 10/2008 | Mould | |
| 2008/0270653 A1* | 10/2008 | Balle | G06F 9/5077 710/109 |
| 2009/0172411 A1 | 7/2009 | Kershaw | |
| 2009/0234987 A1* | 9/2009 | Lee | G06F 9/5038 710/39 |
| 2010/0023666 A1 | 1/2010 | Mansell | |
| 2010/0161948 A1 | 6/2010 | Abdallah | |
| 2011/0083130 A1 | 4/2011 | Boldyrev et al. | |
| 2011/0265084 A1 | 10/2011 | Knowles et al. | |
| 2011/0271126 A1 | 11/2011 | Hill | |
| 2011/0307681 A1 | 12/2011 | Piry | |
| 2012/0233410 A1 | 9/2012 | Fu | |
| 2012/0260239 A1 | 10/2012 | Martinez Canedo | |
| 2013/0179666 A1* | 7/2013 | Yamashita | G06F 9/3834 712/228 |
| 2014/0032886 A1 | 1/2014 | Santis | |
| 2014/0082624 A1* | 3/2014 | Iwabuchi | G06F 9/4881 718/102 |
| 2014/0157287 A1 | 6/2014 | Howes et al. | |
| 2014/0258693 A1 | 9/2014 | Lindholm et al. | |
| 2014/0298338 A1 | 10/2014 | Doi | |
| 2014/0304708 A1 | 10/2014 | Martz et al. | |
| 2014/0351519 A1* | 11/2014 | Munoz | G06F 12/0811 711/122 |
| 2014/0359636 A1 | 12/2014 | Xu | |
| 2014/0365662 A1 | 12/2014 | Dave | |
| 2015/0052329 A1 | 2/2015 | Fujinami | |
| 2015/0254104 A1* | 9/2015 | Kessler | G06F 9/4881 711/170 |
| 2015/0277920 A1 | 10/2015 | Bradbury | |
| 2016/0098303 A1 | 4/2016 | Balakrishnan | |
| 2016/0239346 A1 | 8/2016 | Kipp | |
| 2017/0034272 A1 | 2/2017 | Kazi | |

OTHER PUBLICATIONS

International Search Report and Written Opinion of the International Searching Authority dated Feb. 13, 2018 in PCT/GB2017/053374, 14 pages.
International Search Report and Written Opinion of the International Searching Authority dated Feb. 19, 2018 in PCT/GB2017/053371, 16 pages.
U.S. Appl. No. 15/361,770, filed Nov. 28, 2016, Inventor: Dunham et al.
U.S. Appl. No. 15/361,819, filed Nov. 28, 2016, Inventor: Dunham et al.
K.K. Rangan et al, "Thread Motion: Fine-Grained Power Management for Multi-Core Systems" *ISCA '09*, Jun. 20-24, 2009, 12 pages.
Office Action dated Apr. 11, 2019 in U.S. Appl. No. 15/361,770, 25 pages.
Office Action dated Apr. 5, 2019 in U.S. Appl. No. 15/361,819, 32 pages.

\* cited by examiner

DATA PROCESSING

BACKGROUND

This disclosure relates to data processing.

In arrangements of one or more interconnected processing elements, a program task such as a thread can be executed by processing elements in successive portions, possibly interspersed with portions of execution of other program tasks. Execution can be passed from one processing element to another. To enable this, a process referred to as context switching may take place.

In a context switch, each processing element is configured to save context data relating to a program task following execution of that program task by that processing element; and to load context data, previously saved by that processing element or another of the processing elements, at resumption of execution of a program task.

SUMMARY

In an example arrangement there is provided data processing apparatus comprising:

one or more interconnected processing elements each configured to execute processing instructions of a program task;

coherent memory circuitry storing one or more copies of data accessible by each of the processing elements, so that data written to a memory address in the coherent memory circuitry by one processing element is consistent with data read from that memory address in the coherent memory circuitry by another of the processing elements;

the coherent memory circuitry comprising a memory region to store data, accessible by the processing elements, defining one or more attributes of a program task and context data associated with a most recent instance of execution of that program task;

the apparatus comprising scheduling circuitry to schedule execution of a task by a processing element in response to the one or more attributes defined by data stored in the memory region corresponding to that task; and each processing element which executes a program task is configured to modify one or more of the attributes corresponding to that program task in response to execution of that program task.

In another example arrangement there is provided a method comprising:

coherently storing one or more copies of data accessible by each of one or more interconnected processing elements, so that data written to a memory address in the coherent memory circuitry by one processing element is consistent with data read from that memory address in the coherent memory circuitry by another of the processing elements;

defining a memory region of the coherently stored data, the memory region to store data, accessible by the processing elements, defining one or more attributes of a program task and context data associated with a most recent instance of execution of that program task;

scheduling execution of a task by a processing element in response to the one or more attributes defined by data stored in the memory region corresponding to that task; and each processing element which executes a program task modifying one or more of the attributes corresponding to that program task in response to execution of that program task.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which.

DESCRIPTION OF EMBODIMENTS

Figure 1:
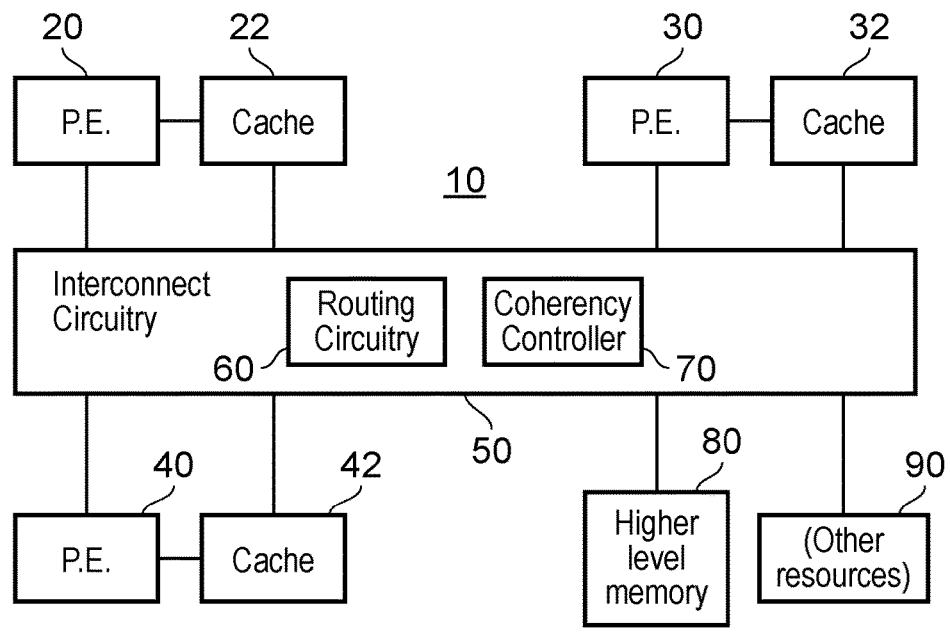
FIG. 1 schematically illustrates a data processing apparatus.

Before discussing the embodiments with reference to the accompanying figures, the following description of embodiments is provided.

An example embodiment provides data processing apparatus comprising:

one or more interconnected processing elements each configured to execute processing instructions of a program task;

coherent memory circuitry storing one or more copies of data accessible by each of the processing elements, so that data written to a memory address in the coherent memory circuitry by one processing element is consistent with data read from that memory address in the coherent memory circuitry by another of the processing elements;

the coherent memory circuitry comprising a memory region to store data, accessible by the processing elements, defining one or more attributes of a program task and context data associated with a most recent instance of execution of that program task;

the apparatus comprising scheduling circuitry to schedule execution of a task by a processing element in response to the one or more attributes defined by data stored in the memory region corresponding to that task; and each processing element which executes a program task is configured to modify one or more of the attributes corresponding to that program task in response to execution of that program task.

Examples of the present technique allow scheduling to be carried out by the interconnected processing elements themselves rather than necessarily requiring the intervention of an operating system, by the processing elements maintaining attribute data relating to each task, modifying the attribute data in response to execution of a task and using the attribute data to perform scheduling.

In examples, each processing element is configured, when scheduled to execute a task, to take exclusive write access to the memory region relating to that program task.

Example arrangements may execute an operating system to manage at least some processing resources of the apparatus. The operating system may have read access to the memory region relating to a program task.

To allow a selection of an operating system based scheduling process rather than that defined here, in examples each program task has associated override data indicating whether, at suspension of that program task, control returns to the scheduling circuitry, or to the operating system. In examples, the operating system has read and write access to the override data.

In examples, each program task has associated state data indicating whether the program task is currently executable, the scheduling circuitry being configured to schedule other program tasks in preference to a program task for which the state data indicates that the task is not currently executable. The operating system may have read and write access to at least a portion of the state data. The apparatus may provide user read and write access to at least a portion of the state data.

For task scheduling, one of the attributes may be a priority indicator, in which:

each processing element is configured to change the priority indicator for a given program task so as to decrease the given program task's priority in response to execution of the given program task by that processing element;

each processing element is configured to change the priority indicator for a given program task so as to increase the given program task's priority in response to allocation of the given program task to that processing element but that processing element not executing the given program task; and the scheduling circuitry is configured to schedule program tasks for execution so as to give preference to program tasks having a higher priority.

In examples, one of the attributes is a time period indicator, in which: a processing element scheduled to execute a given program task is configured to suspend execution of the given program task at the end of a time period of execution defined by the time period indicator for that program task.

To allow previous instances of execution to be taken into account in scheduling, for example to provide localisation of processing (to reduce latency in a context switch) one of the attributes may define history data indicating those processing elements used in one or more previous instances of execution of the processing task. For example, the history data may indicate processing element performance in respect of the one or more previous instances of execution.

To allow the same coherent mechanism, or another mechanism, to be used to handle the context data, in examples one of the attributes defines a pointer to a storage location of the context data.

In examples, one of the attributes indicates a hardware specification for a processing element to execute that program task.

The attributes can conveniently be stored by the scheduling circuitry being configured to allocate a memory region to a program task in response to initiation of that program task and to remove the allocation of a memory region from a program task in response to termination of that program task.

In examples, the coherent memory circuitry comprises two or more coherent cache memories and the coherent memory circuitry is configured to store multiple copies of the data accessible by each of the processing elements.

Another example embodiment provides a method comprising:

coherently storing one or more copies of data accessible by each of one or more interconnected processing elements, so that data written to a memory address in the coherent memory circuitry by one processing element is consistent with data read from that memory address in the coherent memory circuitry by another of the processing elements;

defining a memory region of the coherently stored data, the memory region to store data, accessible by the processing elements, defining one or more attributes of a program task and context data associated with a most recent instance of execution of that program task;

scheduling execution of a task by a processing element in response to the one or more attributes defined by data stored in the memory region corresponding to that task;

each processing element which executes a program task modifying one or more of the attributes corresponding to that program task in response to execution of that program task.

Referring now to the drawings, FIG. 1 schematically illustrates a data processing apparatus comprising: a plurality of processing elements (as examples of data handling nodes 20, 30, 40) and interconnect circuitry 50 connected to the plurality of data handling nodes. The interconnect circuitry comprises data routing circuitry 60 for controlling and monitoring data handling transactions as between the various data handling nodes and a coherency controller 70, to be discussed below.

The data handling nodes 10 . . . 20 can include various types of node, such as, for example, a processing element such as a CPU (central processing unit, as an example of a data processing element) or CPU cluster, possibly with an associated cache memory; a memory; peripheral components such as input/output components, direct memory access (DMA) devices and so on. In the present example they are processing elements. However, the present embodiments envisage arrangements with only one processing element and cache memory, and arrangements with more than one processing element. Indeed, a feature of the present arrangements is that in use, processing elements and/or cache memory devices may be added to the interconnected arrangement (for example by being newly connected or newly enabled for operation (such as powered up)), or may be removed from the interconnected arrangement (for example by being physically removed from the interconnected arrangement or by being logically removed, for example by being powered down).

Each processing element in this example is associated with a cache memory 22, 32, 42. The cache memories store locally and quickly accessible copies of data, for example data held in a higher level memory 80 such as a main memory or a higher level cache memory.

Other processing or data handling resources 90 may also be connected to the interconnect circuitry 50.

The data processing apparatus of FIG. 1 may be implemented as a single integrated circuit, for example as a so-called system on a chip (SoC) or a so-called network on a chip (NoC). Alternatively, the data processing apparatus of FIG. 1 may be implemented as multiple discrete and interconnected systems.

The data processing apparatus of FIG. 1 is just one example of how a set of processing elements may be interconnected. In other examples, processing elements are interconnected by a bus, network, memory, RDMA (remote direct memory access, allowing a processing element of one computer to access the memory of another processing element of another computer without the involvement of either device's operating system), or equivalent device. Therefore, the interconnect circuitry 50 is simply an example indicative of various types of networking, interconnecting, bus or other circuitry to interconnect processing elements to allow the exchange of data and the switching of task execution in the manner described here.

In example embodiments, the interconnect circuitry may be an example of so-called cache coherent interconnect circuitry. Here, the term "coherent" refers to the maintenance of a correct relationship between multiple copies of the same data stored across the whole system. For example, data may be stored in a cache memory device 22 by one of the data handling nodes (such as the node 20). Other nodes (such as the nodes 30, 40) may be processing elements having their own respective caches 32, 42 which, depending on the nature of the processing element operations, may store one or more copies of data which is also held in the cache memory 22. In the case of a data handling access by one node to such information, there is a need to ensure that the accessing node is accessing the latest version of the stored information, and that if it makes any alteration to the stored information, either the other versions are correctly altered themselves or the other versions are deleted or invalidated. In general terms, the caches 22, 32, 42 and the coherency controller 70 provide coherent memory circuitry storing one or more copies of data accessible by each of the processing elements (for example, each of the processing elements connected via the interconnect circuitry 50), so that data written to a memory address in the coherent memory circuitry by one processing element is consistent with data read from that memory address in the coherent memory circuitry by another of the processing elements.

In examples, the coherent memory circuitry comprises two or more coherent cache memories (22, 32, 42) and the coherent memory circuitry is configured to store multiple copies of the data accessible by each of the processing elements.

In the example situation discussed above of devices being added to or subtracted from the interconnected arrangement, the coherency controller 70 can be arranged to react to the addition of a device by adding it to the so-called coherency domain, and bringing it into coherent operation with other devices in the interconnected arrangement, and to react to the subtraction of a device by reconfiguring the coherent domain to operate in the absence of that device. This reconfiguring may involve first ensuring (before the device is removed) that any data updates at that device are appropriately propagated to other coherent devices and/or the higher level memory.

The data routing circuitry 60 and/or the coherency controller 70 include various mechanisms and circuitry to provide for coherent operation. Examples of these will be discussed below.

An example processing element in the arrangement of FIG. 1 may make reference to data stored in an associated cache memory, with both the processing element and the cache memory being in communication with the interconnect circuitry. The cache memory may store copies of information held in the higher level memory 80. In some instances, the two copies can be the same, for example if a copy has been cached during a memory read operation. In other instances, circumstances could arise which would lead to copies differing from one another, for example if a data write operation has been carried out by a particular processing element (such as the processing element 20) with respect to the copy of a data item stored in the cache 22. In a system of multiple caches, there is a need to ensure that before one version of a data item is accessed, any changes which have been implemented in respect of other versions are fully implemented for all copies.

The role of logic associated with the cache coherence function is therefore to ensure that before a data handling transaction takes place, if the version of the data item to be accessed is out of date (because of a modification made to another copy of the same data item), the copy to be accessed is first brought up to date. Similarly, if the data handling transaction involves modifying a data item, then cache coherence logic avoids conflicts with other existing copies of the data item. Techniques for achieving this include (for example) the use of a so-called "snoop filter".

The term "snoop filter" is a historical one and is used here to refer to a control device forming part of the coherency controller 70 having an associated "directory", where the directory stores information indicating which data is stored in which cache, and the snoop filter itself at least contributes to the handling of data accesses to cached information so as to provide a cache coherence function.

For example, a snoop filter, having a directory as discussed above and a register indicating those cache memories which are currently part of the coherency control arrangement (otherwise referred to as being in the coherent system or in the coherent domain) forms part of the coherency controller 70 associated with the routing circuitry 60. The routing circuitry 60 is in data communication with the one or more cache memories.

The snoop filter handles at least a part of a process under which, when any of the data handling nodes 20 . . . 40 intends to access or modify data which is stored as a cache line in any of the cache memories, that node obtains permission to do so. As part of this process, the snoop filter checks whether any other cache memories have a copy of the line which is to be modified. If any other copies are in existence at other cache memories, then those copies need to be cleared and invalidated. If those copies themselves contain modifications to the stored data in that line, then in at least some circumstances, the coherency controller 60 (or the snoop filter itself) instructs the cache memory to write that line back to main memory.

In the case of a read access by a node with respect to data stored in a cache memory, it is important that the node 20 . . . 40 requesting the read has access to the latest correct version of the cached data. The coherency controller 70 oversees this process so that if another cache has a recently-modified version of the required data, that other cache writes back the modified version and/or forwards a copy of the modified version for caching at the currently requesting node.

The coherency controller 70 including the snoop filter therefore provides an example of a cache coherency controller configured to coordinate, amongst the cache memories, an access to a memory address by one of the cache memories when the directory indicates that another of the cache memories is caching that memory address. The snoop controller stores or provides a directory such as the directory mentioned above indicating, for memory addresses cached by one or more of a group of one or more cache memories connectable in a coherent cache structure, which of the cache memories are caching those memory addresses.

Figure 2:
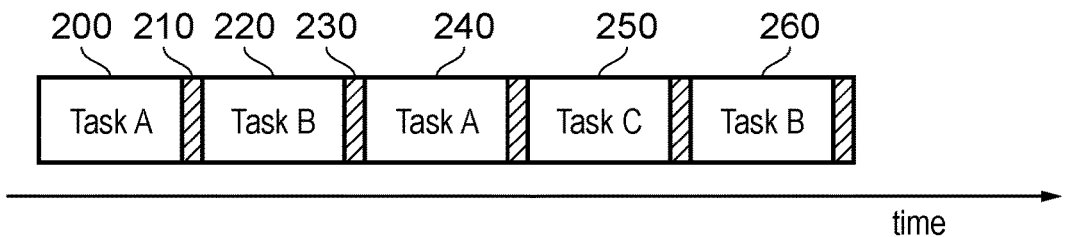
FIG. 2 schematically illustrates task switching by a processing element.

FIG. 2 schematically illustrates task switching by a processing element such as one of the processing elements 20 . . . 40 of FIG. 1.

In general terms, program functions are carried out by executing program code and referred to here as "tasks". An example of a task is a processing thread. Execution of a task may take place for a particular period and then the processing element can switch to execution of a different task before, potentially, returning to the first task for another period and so on.

In between these periods, a so-called context switch takes place. The context switch involves saving a current state of the processing element at the end of execution of a particular task and restoring a previously saved stated of the processing element in preparation for a period of execution of another task. Overall, this can give the impression that the processing element is handling multiple programs or "threads" at once, whereas in fact it is executing small portions of each task intermittently.

In the example of FIG. 2, the processing element executes, for a period 200, a first task (task A). There is then a short period 210 during which the context switch referred to above takes place. Here, the processing element saves context data relating to the program task A following execution of that program task by the processing element, and loads context data, previously saved by that processing element or another processing element, at resumption of execution of a next task (task B) in a period 220.

So, it can be seen that a particular processing element may execute a particular task for a period, but then having saved the context data relating to that task, execution of that task may next be taken up in a subsequent period by that processing element another of the interconnected processing elements.

At the end of execution of task B in the period 220, a context switch occurs in a period 230 followed by execution of task A again in a period 240, with subsequent tasks in this example being task C in a period 250 and task B in a period 260.

The arrangement of FIG. 2 relates to one of the processing elements. In the system of FIG. 1, there are three example processing elements and each may be switching between tasks in the manner shown. A particular task may be executed by successive (though not necessarily contiguous) periods of execution on any of the processing elements, with the saved context data being used to facilitate the switching of the task from one processing element to another.

Figure 3:
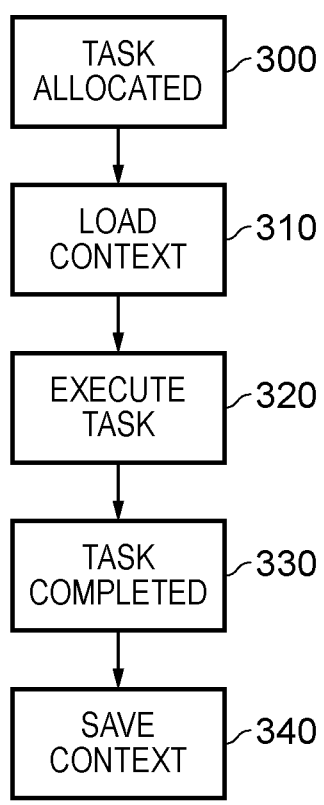
FIG. 3 is a schematic flowchart illustrating task execution.

FIG. 3 is a schematic flowchart illustrating some basic aspects of task execution in the manner described with reference to FIG. 2.

At step 300, a task is allocated to a particular processing element. The allocation of tasks is carried out by scheduling circuitry in one example, and this will be discussed further below.

At a step 310, the processing element loads previously-saved context data relating to that task (saved by the previous processing element to execute that task, whether or not that is the same processing element as the one about to execute the task) and at a step 320 executes the task for a period of time.

Note that the steps 310, 320 may overlap in time. A certain amount of context data may be required in order to start the execution of a task, but other items of context data may be loaded after execution has started or may even be deferred until they are required (a so-called "lazy" loading of context data). This arrangement can provide for potentially faster context switching because it can reduce the amount of context data which has to be loaded before task execution can even start, so allowing execution to start sooner than would be possible if every possible item of context data were first loaded before commencing execution.

The execution of the task can continue until, for example, a processor interrupt is received which may be due to an external interrupt situation or may be in response to a timer indicating that the period of time allocated to that particular instance of execution of that task has come to an end. At a step 330, that instance of execution of that task is completed and, following execution of that program task, context data is saved at a step 340. The process of FIG. 3 may then be restarted by that processor in respect of a next task to be executed.

Figure 4:
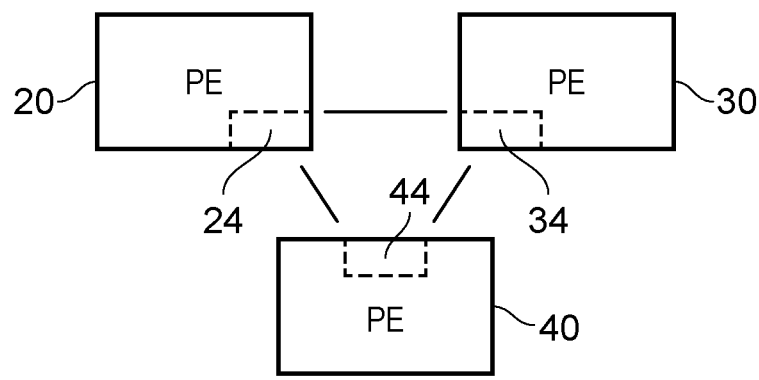
FIGS. 4 to 6 schematically illustrate implementations of scheduling circuitry.
Figure 5:
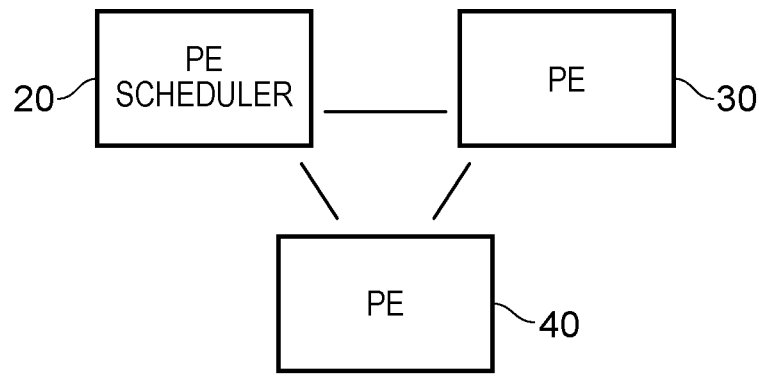
Figure 6:
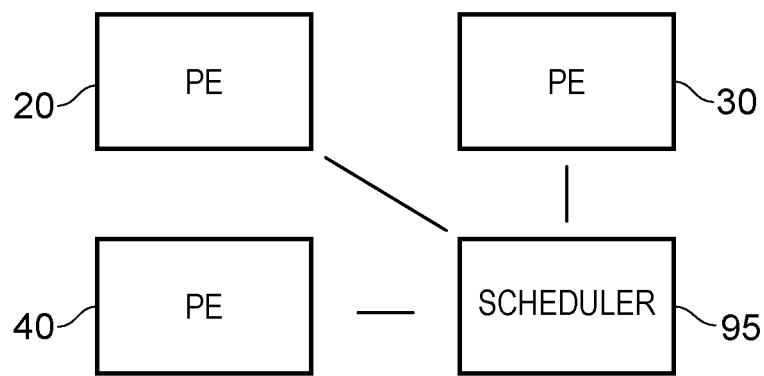

FIGS. 4 to 6 schematically illustrate example implementations of scheduling circuitry.

In each of FIGS. 4 to 6 the three example processing elements 20, 30, 40 are shown. Other parts of the circuitry of FIG. 1 are not shown, as this description relates just to the interactions between the processing elements.

The scheduling of tasks for execution by the processing elements can be carried out in various ways, for example at least in part under the control of an operating system overseeing processing resources of the system. In brief, in FIG. 4 the operation to schedule tasks and to select a context format (to be discussed further below) is distributed between all of the processing elements connected to the current network, as indicated by the broken line portions 24, 34, 44 indicating that a part of the functionality of each processing element is provided to carry out the scheduling process.

In FIG. 5, one processing element, in this example the processing element 20, is dedicated to providing the scheduling function.

In FIG. 6, a separate device 95 connected to the interconnect 50 of FIG. 1 is provided to give the scheduling function.

Figure 7:
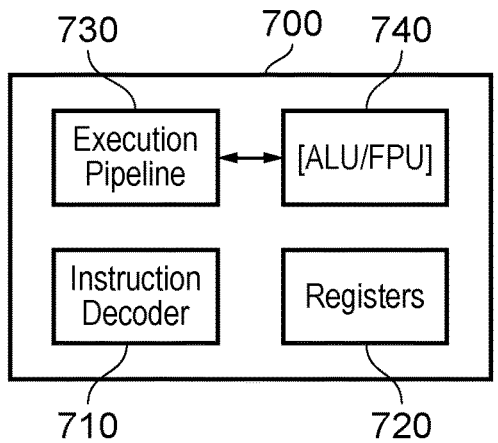
FIG. 7 schematically illustrates a processing element.

FIG. 7 schematically illustrates a processing element 700, for example for use as one of the processing elements 20, 30, 40. Only some features of the processing element are shown here which are relevant to the present description. The skilled person will understand that a processing element may comprise other features which are not shown in FIG. 7.

The processing element comprises an instruction decoder 710, one or more registers 720, an execution pipeline 730 and a specialised computational unit such as an arithmetic logic unit or a floating point unit 740.

Figure 8:
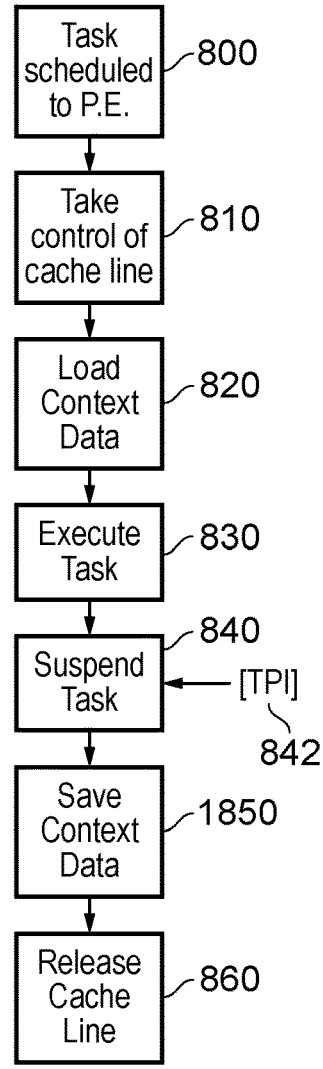
FIG. 8 is a flowchart schematically illustrating task switching.

FIG. 8 is a schematic flowchart illustrating task execution, providing more detail than the flowchart of FIG. 3 discussed above.

In FIG. 8, the process by which context data is stored and retrieved is discussed in more detail. In particular, the context data is stored in the coherent memory structure discussed above. A processing element handling a task takes control of a memory area such as a so-called cache line during execution of the task; it reads context data from that cache line and, following execution of the task, writes context data back to that cache line. So, the control of the cache line is used in part to administer the scheduling and control of a particular instance of execution of a task. The memory area or cache line corresponding to a program task is used or configured to store context data relating to that program task. Each processing element is configured, in response to suspension of a program task by that processing element, to save context data relating to that program task to the respective memory region of the coherent memory circuitry Referring to FIG. 8, a task is scheduled to a processing element by the scheduling circuitry at a step 800 (for example, under the control of the operating system). At a step 810, the processing element takes control of the cache line or other memory area associated with the context data for that task. This may involve for example the processing element temporarily taking exclusive write access to that cache line (or more generally the memory region corresponding to a program task) in the coherent domain, at least while that processing element is executing that program task.

At a step 820, the processing element loads context data from that cache line or other memory area and, at a step 830 executes the task. As before, it is noted that the loading of context data and the execution of the task can overlap in time such that the processing element may be configured to detect, after loading (at least some) context data and resuming execution of a program task, whether that processing element requires further data items generated by another of the processing elements which previously executed that program task and, when such further data items are required, to load those further data items. The further data items may be stored in the same cache line or memory area or may be accessible through other memory areas. However, the context data which has to be loaded at the step 820 in order to commence execution of the task at the step 830 is provided in the controlled cache line.

At a step 840, the processing element suspends execution of the task. This may be in response to a break point in the program code, to a time period indicator 842 discussed below, to an interrupt received by the processor and so on. At a step 850, the processing element saves the context data to the cache line discussed above and, at a step 860, releases control of that cache line. In other words, each processing element is configured, in response to suspension of execution of a program task by that processing element, to release exclusive write access of that memory region (corresponding to that program task).

Each processing element in these examples is therefore configured, at resumption of execution of a program task (the step 800), to take exclusive write access (at the step 810) to a memory region of the coherent memory circuitry in which context data relating to that program task, previously saved by that processing element or another of the processing elements, is stored and to load the stored context data from that memory region.

Arrangements for scheduling tasks amongst the processing elements will now be discussed.

In examples, the coherent memory circuitry comprising a memory region to store data, accessible by the processing elements, defining one or more attributes of a program task and context data associated with a most recent instance of execution of that program task.

The apparatus comprises scheduling circuitry (for example as discussed above with respect to FIGS. 4-6) to schedule execution of a task by a processing element in response to the one or more attributes defined by data stored in the memory region corresponding to that task; and each processing element which executes a program task is configured to modify one or more of the attributes corresponding to that program task in response to execution of that program task.

In this way, scheduling can take place, without necessarily requiring the services or resources of an operating system (OS), on the basis of the stored attribute data, which are themselves modified as appropriate by a processing element executing a task.

An example of some of the attribute data stored in this way will now be described. Note that amongst the following example fields, some fields may or may not be present. Other fields, not discussed below, may be present. These data may for example be stored in the memory region discussed above.

| | | | Example allocation | Notes |
|---|---|---|---|---|
| Administrative state (software or OS controlled) OS has read and write access. | | | | |
| i. | User override | | 1 bit | an example of override data - see below |
| ii. | Is it a runnable thread? | | 1 bit | an example of state data - see below |
| iii. | Nice/priority | | 3 bits | |
| iv. | Performance or power oriented? | | 1 bit | |
| v. | Quanta allotment | | 32 bits | an example of a time period indicator |
| Operating status (hardware controlled) OS has read only access. | | | | |
| vi. | Device ID | | 24 bits | |
| vii. | Is it active? | | 1 bit | |
| viii. | Is it a runnable thread? | | 1 bit | an example of state data - see below |
| ix. | Time stamp of last commit | | 32 bits | |
| x. | Excepted (error) state | | 1 bit | |
| xi. | Run priority | | 3 bits | an example of a priority indicator |
| xii. | Effort | | 16 bits | an example of history data |
| xiii. | Quanta used | | 32 bit | an example of history date indicating a time period of a most recent execution of that task |
| xiv. | Short history | L/S per quanta | 64 bits | an example of history data indicating processing element performance in respect of the one or more previous instances of execution. |
| | | Insn retired per quanta | 47 bits | |
| | | Power usage | 17 bits | |

-continued

| | | Example allocation | Notes |
|---|---|---|---|
| xv. | Device frequency/voltage setting | 4 bits | an example of one of the attributes indicating a hardware specification for a processing element to execute that program task. |
| xvi. | Previous device ID | 24 bites | an example of history data indicating those processing elements used in one or more previous instances of execution of the processing task. |
| xvii. | Pointer to active register state | 64 bits | an example of one of the attributes defining a pointer to a storage location of the context data. |

The OS may also have read access to the stored context data.

The following discussion of the fields discussed above is provided.

In general terms, it will be seen that some fields are under the control of the OS, and some are under hardware (processing element/user) control. The OS may have read access to the hardware controlled fields.

i. In examples, each program task has associated override data indicating whether, at suspension of that program task, control returns to the scheduling circuitry, or to the operating system. By setting this bit to indicate that control returns to the OS, the present arrangements (in which scheduling is carried out by the processing elements themselves) can be overridden. If the OS carries out scheduling, it does so (at least in part) according to the nice/priority field iii.

ii, viii. In examples, each program task has associated state data indicating whether the program task is currently executable, the scheduling circuitry being configured to schedule other program tasks in preference to a program task for which the state data indicates that the task is not currently executable. The operating system may have read and write access to at least a portion of the state data (for example, item ii). The apparatus may provide user read and write access to at least a portion of the state data (for example, item viii). If a thread is stalled, for example because it is waiting for a requested service from the OS, this bit or bits (one or both of which may be provided) can be set so that the thread is temporarily excluded from scheduling.

iii. Nice/priority is a field indicating the ability to be deferred (niceness) and/or a priority for execution (priority) for OS scheduling.

iv. Performance or power oriented? This is a field indicating whether a thread should be scheduled to a processor for maximum performance or to another processor (or a processor operating at a reduced power consumption) for low power operation.

v. Quanta allotment is a field defining a maximum time period for execution of a task before task switching takes place. For example, it may be a number of nanoseconds. At the end of the period, as discussed in connection with the item 842 above, execution is brought to a halt, for example by a processor interrupt.

vi. Device ID indicates an identifier of a processing element currently executing the program task.

vii. Is it active? is a field indicating whether the task is currently being executed.

ix. Time stamp of last commit is a field indicating when the most recently completed execution of the task terminated.

x. Excepted (error) state is a field indicating that execution of the program task is currently in an excepted (error) state.

xi. In examples, each processing element is configured to change the priority indicator for a given program task so as to decrease the given program task's priority in response to execution of the given program task by that processing element; each processing element is configured to change the priority indicator for a given program task so as to increase the given program task's priority in response to allocation of the given program task to that processing element but that processing element not executing the given program task; and the scheduling circuitry is configured to schedule program tasks for execution so as to give preference to program tasks having a higher priority. For example, a three bit value is maintained (and may, in some examples, be seeded with an initial value by the value iii discussed above). Each time that the scheduling process defers execution of a program task in favour of another task, the priority is changed, for example by one, towards a higher priority (for example, decremented in an arrangement in which a lower numerical value indicates a higher priority). If the program task is scheduled for execution, its priority is altered, for example by one, towards a lower priority (for example, incremented). When the program task's priority reaches the highest possible priority value it is guaranteed to be executed.

Various items of historical data are provided. These may be provided in respect of the immediately preceding instance of execution or in respect of a predetermined number (such as three) preceding instances.

vii. Effort (for example, a value indicating a fraction of available processor effort, up to 100%) indicates the processor work carried out in respect of a previous instance of execution of the program task.

viii. Quanta used indicates the time period actually used in respect of the preceding execution.

ix. Short history data includes load/store operations per quanta (that is to say, per nanosecond (in the current example) in the last instance of execution), the number of instructions retired per quanta and the power usage.

x. Device frequency/voltage setting xi. Previous device ID indicates the device identifier of the processing element which carried out the preceding instance of execution.

xii. Pointer to active register state indicates where the context data relating to this task is stored.

These data are provided in a global table (which is to say, it is accessible by each of the processing elements in the interconnected arrangement and by the OS) to manage scheduling of each context (each program task), provide a technique to allocate work between cores, and to provide fields that can be used to schedule contexts on heterogeneous hardware. This table is intended to be shared among multiple (potentially heterogeneous) devices both within the same node and across any network interface capable of constructing a bi-directional interface.

Each program task is provided with a set of entries or fields as discussed above.

The state of the table is divided into two domains, one where software can write to the other that is entirely hardware managed, but software can read. The OS/Runtime has access to write to the Administrative State bits, while the hardware has complete access to r/w the Operating Status bits, the OS/Runtime have rights to read these only.

The table could be implemented as a virtual memory allocation, or implemented as a hardware table. It is maintained in a coherent manner for access by the processing elements.

To address latency in context switches the locality of where contexts are run can be taken into account. To address this, the data includes a history of the past (for example, three) processing elements on which the context was run, including the efficiency level for each device (Load/Store counts, instructions retired, see context history bits above).

The following text describes a series of actions given start-up, thread creation, and migration of a system using the virtual context format and the virtual context table scheduling mechanism described here. The actions are listed by action with descriptive text below.

(a) On Boot

On boot, there exists a single thread context in the hardware context table. The register state is the same as the on boot state as presently defined for (e.g.) an AArch64 processing element. In that example this is primarily zeroed registers, PC:=RVBAR, and executing in the highest supported Exception Level. The User Override bit is set so that traps are delivered to software as would be expected by software.

(b) Thread Creation—from Supervisor

Thread creation involves creating a new entry in the table discussed above, for the newly created thread.

(c) Thread Creation—Clone

This is a new, hardware accelerated process where the hardware automatically clones the table entry and claims coherency ownership of the new thread's context data store (the context line itself defined by the table entry and the memory contexts of the virtual context pointer). This way it can be filled out lazily, which might be delayed until the end of the new thread's first quantum. This could also be done in memory with techniques like row-clone without involving the main processor, tying into many compute near memory techniques.

The thread creation steps discussed above provide an example of the scheduling circuitry being configured to allocate a memory region to a program task (for its table) in response to initiation of that program task and to remove the allocation of a memory region from a program task in response to termination of that program task.

(d) Context Swap on

The context or program task in question has been chosen by the hardware thread scheduler (which queues contexts within a run-queue for each compute element). It is not currently running but will be shortly. The hardware scheduler adds the table entry to the processing element's run queue and the data associated with that table entry is transferred via the coherency mechanism. At this point it can start executing the thread. The processing element will fetch from memory the values of the registers necessary to make correct progress. It may, at its own discretion, write any portion of this context back to memory, whether write back (perhaps to spill for physical register pressure) or write-through (to optimize thread descheduling for rarely-written control registers). The true write-back requirements are detailed in the next section.

(e) Context Swap Off

The table entry is re-inserted in the run queue based on the priority. The run bit is set to 0 and the priority is adjusted based on the quanta used, or if not run due to high priority task priority is decremented (where zero represents the highest priority). The context store for the Virtual Context is still owned by the processing element until written back, which can be forced by demand requests from another processing element, for instance in the case of migration.

(f) Migration to Another Processing Element

The new processing element claims coherency ownership of the table entry by updating the Device ID and setting the run bit to 0. It then performs the steps listed under Context Swap On (above).

(g) Run Queue

The table entry is initially placed in a run queue for the processing element on which its parent was executing. To initiate migration of a context, its table entry is inserted in the destination processing element's run queue, and the hardware scheduler sets the priority (either maximum priority or inherit parent context priority). Each CE's run queue is implemented so that it honours priority in an ascending order and maintains temporal ordering of table entries for each processing element (for example, table entries with priority 0 and time N will be run before HCT entry with priority 0 and time N+1).

Figure 9:
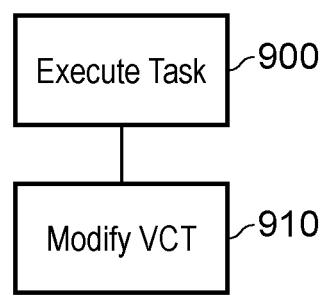
FIGS. 9 to 11 are schematic flowcharts illustrating methods.
Figure 10:
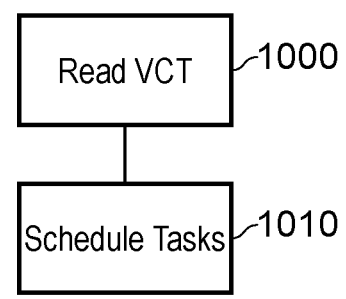

These operations can be summarised by the schematic flowcharts of FIGS. 9 and 10.

Referring to FIG. 9, at a step 900, a processing element executes a program task. At a step 910, the processing element modifies the virtual context table (the table discussed above) in response to that execution.

Referring to FIG. 10, at a step 1000, the scheduling circuitry, which may be implemented by one or more of the processing elements as discussed above, reads the table for a program task and, at a step 1010, schedules that program task for execution.

Figure 11:
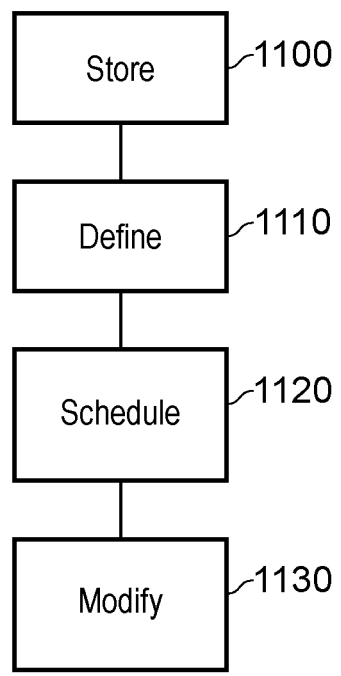

FIG. 11 is a schematic flowchart illustrating a method comprising:

coherently storing (at a step 1100) one or more copies of data accessible by each of one or more interconnected processing elements, so that data written to a memory address in the coherent memory circuitry by one processing element is consistent with data read from that memory address in the coherent memory circuitry by another of the processing elements;

defining (at a step 1110) a memory region of the coherently stored data, the memory region to store data, accessible by the processing elements, defining one or more attributes of a program task and context data associated with a most recent instance of execution of that program task;

scheduling (at a step 1120) execution of a task by a processing element in response to the one or more attributes defined by data stored in the memory region corresponding to that task; and (at a step 1130) each processing element which executes a program task modifying one or more of the attributes corresponding to that program task in response to execution of that program task.

The apparatus of claim 1, operating in accordance with the method of FIG. 11, provides an example of data processing apparatus comprising:

one or more interconnected processing elements each configured to execute processing instructions of a program task;

coherent memory circuitry storing one or more copies of data accessible by each of the processing elements, so that data written to a memory address in the coherent memory circuitry by one processing element is consistent with data read from that memory address in the coherent memory circuitry by another of the processing elements;

the coherent memory circuitry comprising a memory region to store data, accessible by the processing elements, defining one or more attributes of a program task and context data associated with a most recent instance of execution of that program task;

the apparatus comprising scheduling circuitry to schedule execution of a task by a processing element in response to the one or more attributes defined by data stored in the memory region corresponding to that task; and each processing element which executes a program task is configured to modify one or more of the attributes corresponding to that program task in response to execution of that program task.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device (such as the processing element 12) may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

We claim:

1. Data processing apparatus comprising:
   one or more interconnected processing elements each configured to execute processing instructions of a program task of a set of one or more program tasks;
   coherent memory circuitry to store one or more copies of data accessible by each of the processing elements, so that data written to a memory address in the coherent memory circuitry by one processing element is consistent with data read from that memory address in the coherent memory circuitry by another of the processing elements;
   the coherent memory circuitry comprising a memory region to store data, accessible by the processing elements, defining, for each program task of the set of program tasks, one or more attributes of that program task and context data representing a processing element state, at the end of executing that program task, of a processing element of the set of one or more interconnected processing elements which most recently executed that program task;
   the apparatus comprising scheduling circuitry to schedule execution of a task by a processing element in response to the one or more attributes defined by data stored in the memory region corresponding to that task;
   each processing element which executes a program task is configured to modify one or more of the attributes corresponding to that program task in response to execution of that program task; and
   each program task has associated override data indicating whether, at suspension of that program task, control returns to the scheduling circuitry or to an operating system.

2. Apparatus according to claim 1, in which each processing element is configured, when scheduled to execute a program task, to take exclusive write access to the memory region relating to the program task which said each processing element is scheduled to execute.

3. Apparatus according to claim 2, further comprising an operating system to manage at least some processing resources of the apparatus.

4. Apparatus according to claim 3, in which each program task has associated state data indicating whether the respective program task is currently executable, the scheduling circuitry being configured to schedule other program tasks in preference to a program task for which the state data indicates that the task is not currently executable.

5. Apparatus according to claim 4, in which the operating system has read and write access to at least a portion of the state data for each program task.

6. Apparatus according to claim 4, in which the apparatus provides user read and write access to at least a portion of the state data for each program task.

7. Apparatus according to claim 2, in which the operating system has read access to the memory region relating to a program task.

8. Apparatus according to claim 1, in which the operating system has read and write access to the override data.

9. Apparatus according to claim 1, in which one of the attributes for each program task of the set of program tasks is a priority indicator, in which:
   each processing element is configured:
   to change the priority indicator for a given program task so as to decrease the given program task's priority in response to execution of the given program task by said each processing element; and
   to change the priority indicator for a given program task so as to increase the given program task's priority in response to allocation of the given program task to said each processing element but said each processing element not executing the given program task; and
   the scheduling circuitry is configured to schedule program tasks for execution so as to give preference to program tasks having a higher priority.

10. Apparatus according to claim 1, in which one of the attributes for each program task of the set of program tasks is a time period indicator, in which:
    a processing element scheduled to execute a given program task is configured to suspend execution of the given program task at the end of a time period of execution defined by the time period indicator for said given program task.

11. Apparatus according to claim 1, in which one of the attributes for each program task of the set of program tasks defines history data indicating those processing elements used in one or more previous instances of execution of the said each processing task.

12. Apparatus according to claim 11, in which the history data indicates processing element performance in respect of the one or more previous instances of execution.

13. Apparatus according to claim 1, in which one of the attributes for each program task of the set of program tasks defines a pointer to a storage location of the context data.

14. Apparatus according to claim 1, in which one of the attributes indicates a hardware specification for a processing element to execute that program task.

15. Apparatus according to claim 1, in which the scheduling circuitry is configured to allocate a memory region to an initiated program task of the set of program tasks in response to initiation of said initiated program task and to remove the allocation of a memory region from a terminated program task of the set of program tasks in response to termination of said terminated program task.

16. Apparatus according to claim 1, in which the coherent memory circuitry comprises two or more coherent cache memories and the coherent memory circuitry is configured to store multiple copies of the data accessible by each of the processing elements.

17. A method comprising:
coherently storing one or more copies of data accessible by each of one or more interconnected processing elements, so that data written to a memory address in the coherent memory circuitry by one processing element is consistent with data read from that memory address in the coherent memory circuitry by another of the processing elements;
defining a memory region of the coherently stored data, the memory region to store data, accessible by the processing elements, defining one or more attributes, for each program task of a set of one or more program tasks, and context data representing a processing element state, at the end of executing that program task, of a processing element of the set of one or more interconnected processing elements which most recently executed that program task;
scheduling execution of a task by a processing element in response to the one or more attributes defined by data stored in the memory region corresponding to that task;
each processing element which executes a program task modifying one or more of the attributes corresponding to that program task in response to execution of that program task; and
each program task has associated override data indicating whether, at suspension of that program task, control returns to the scheduling execution of the task by the processing element or to an operating system.

* * * * *